Figure 1:
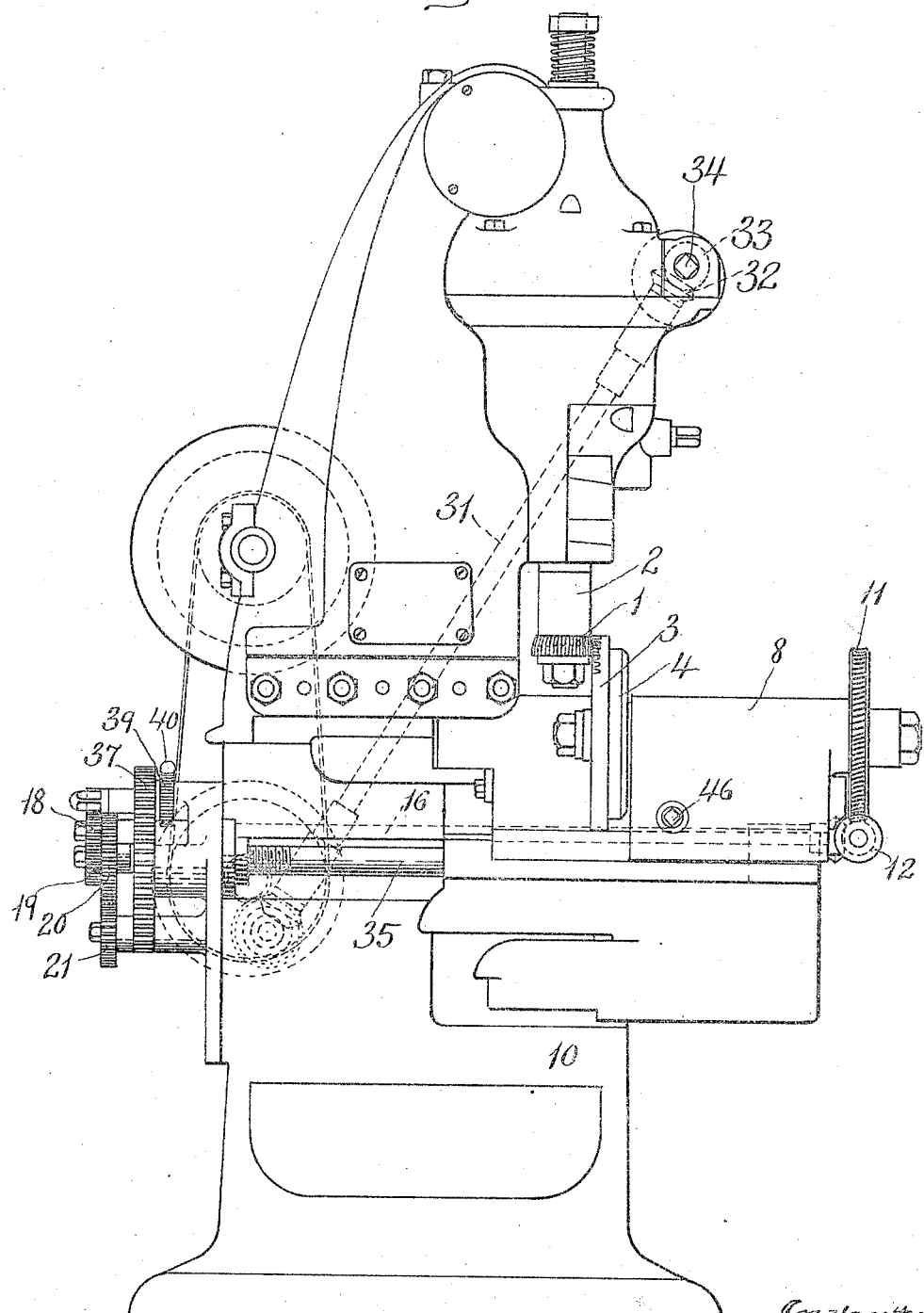

E. R. FELLOWS.
GEAR GENERATING MACHINE.
APPLICATION FILED APR. 2, 1909.

982,581.

Patented Jan. 24, 1911.
4 SHEETS—SHEET 1.

Witnesses:
A. C. Ratigan
E. Batchelder

Inventor:
E. R. Fellows
By Wright Brown Quinby May
Attys.

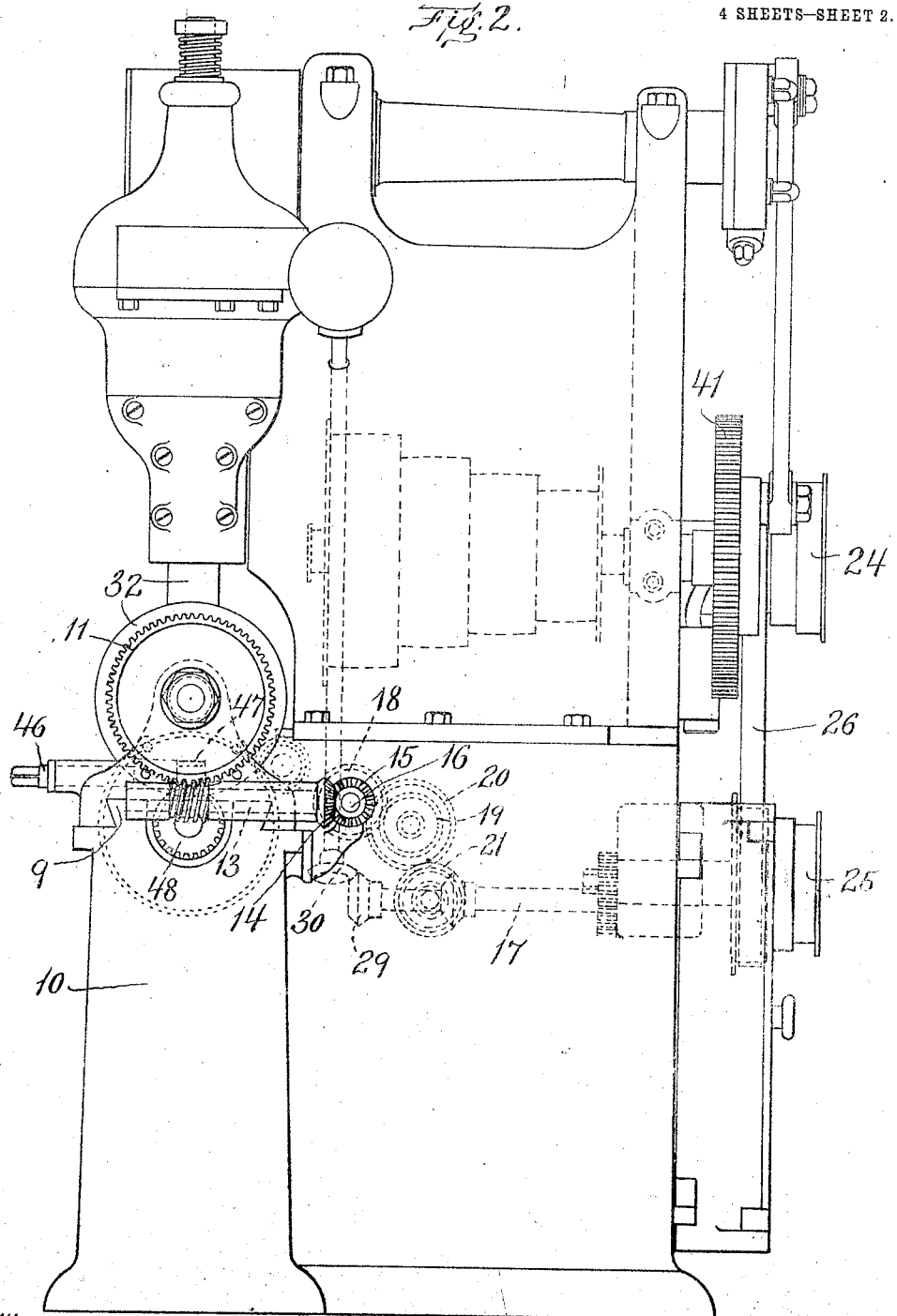

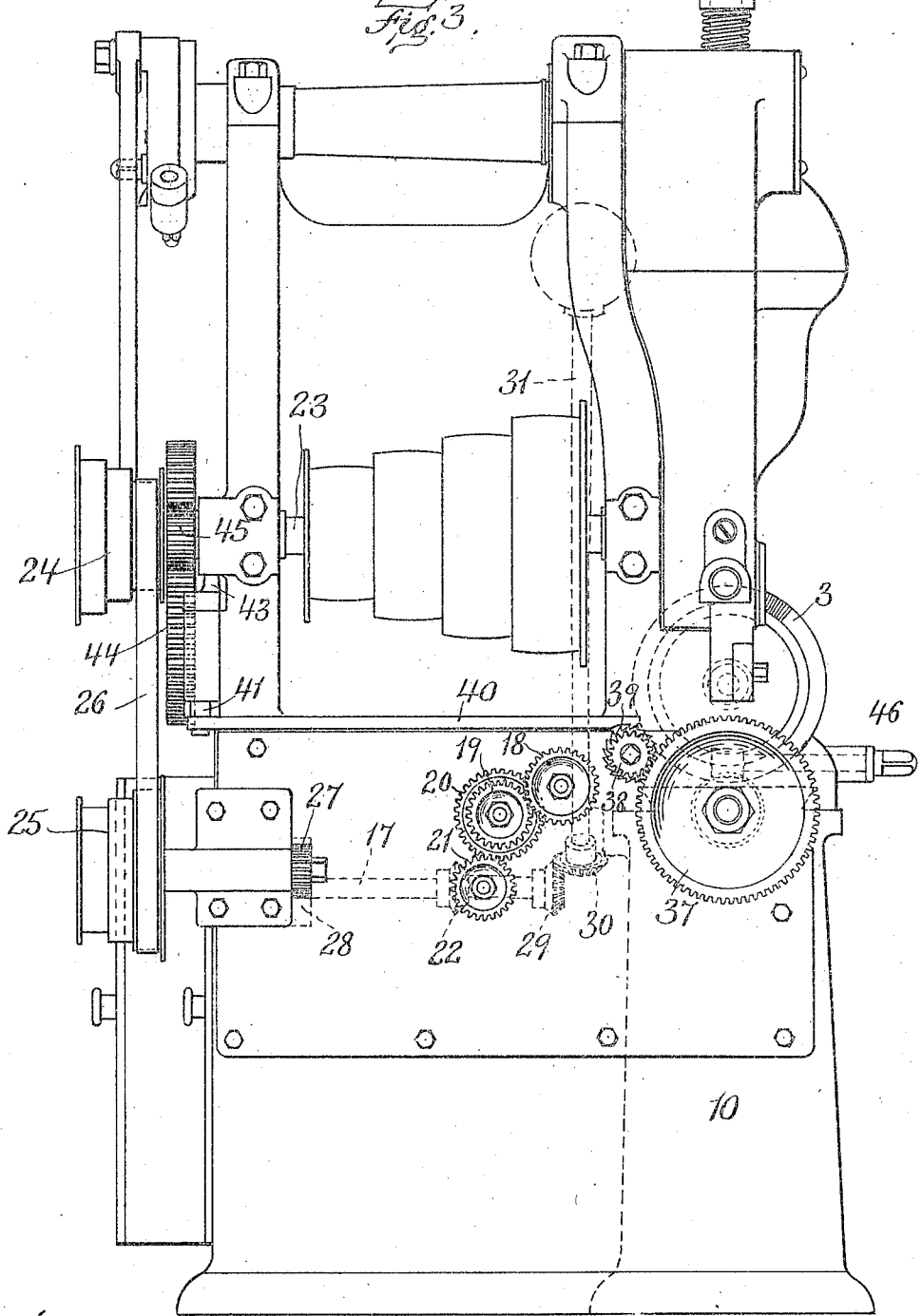

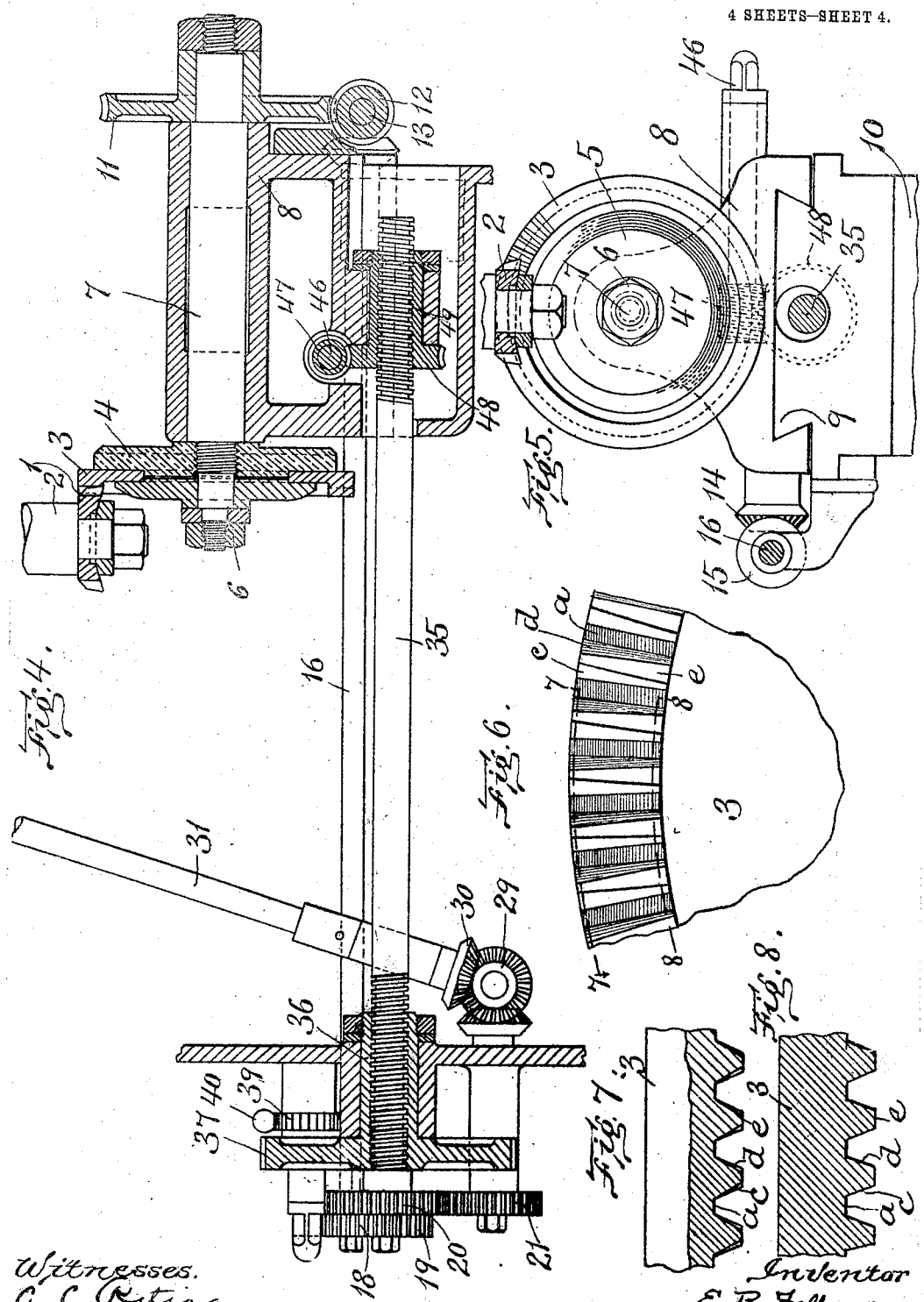

UNITED STATES PATENT OFFICE.

EDWIN R. FELLOWS, OF SPRINGFIELD, VERMONT, ASSIGNOR TO STONE-PROBST AXLE COMPANY, OF COLUMBUS, OHIO, A CORPORATION OF OHIO.

GEAR-GENERATING MACHINE.

982,581.  Specification of Letters Patent.  Patented Jan. 24, 1911.

Application filed April 2, 1909. Serial No. 487,521.

*To all whom it may concern:*

Be it known that I, EDWIN R. FELLOWS, of Springfield, in the county of Windsor and State of Vermont, have invented certain new and useful Improvements in Gear-Generating Machines, of which the following is a specification.

This invention relates to gear-generating machines of the general character described in my prior Patents No. 579,708, granted March 30, 1897, and No. 879,531, granted February 18, 1908, for planing the teeth on gears and the like by the generating system, in which a gear-shaped cutter is employed to act in the manner of a planing or shaping tool on work, and is rotated in conjunction with the work to give a feed movement similar to that of intermeshing gears, so that the curves of the teeth formed on the blank may be generated, of a form adapting them to mesh properly with gears having teeth similar in pitch and shape to those of the cutter.

The object of the present invention is to provide a machine working on this principle, adapted to generate the teeth of crown gears or gears of like nature, in which the teeth project in an axial direction from a face thereof, instead of from the periphery or rim of the gear.

In carrying my invention into effect, I have devised a machine similar in its general nature to that illustrated in Patent No. 879,531, above referred to, but modified so as to be adapted to hold a gear blank with its axis extending transversely of the axis of the cutter, instead of approximately parallel therewith, as in the case of my prior inventions. The gear blank is thus held so that its plane is approximately parallel with the path in which the cutter reciprocates, so that the latter travels across the face of the disk and cuts teeth in such face or in a circular rib projecting axially from the face.
Of the accompanying drawings,—Figure 1 represents a front elevation of a gear-generating machine embodying my present invention. Fig. 2 is a side elevation as seen from the right of Fig. 1. Fig. 3 is a left-hand side elevation. Fig. 4 is a vertical section of the work holder, cutter and feeding mechanism. Fig. 5 shows an elevation of the work-holding slide, of the actuating mechanism associated therewith, the gear blank, and a sectional view of the cutter. Fig. 6 is an elevation of a portion of a gear, illustrating the character of the work performed by the improved machine. Figs. 7 and 8 are sectional views of the teeth taken on lines 7—7 and 8—8 respectively, of Fig. 6.

The same reference characters indicate the same parts in all the figures.

The general construction of the machine is similar to that of Patent No. 879,531, before referred to. Hence only those parts which have been constructed and arranged differently from what is shown in the said patent, in order to accomplish the new result desired, need to be here specifically described.

The cutter is represented at 1 and is made in the shape of a gear having radial gear-shaped cutting teeth, as in my prior patents. This cutter is mounted upon a spindle 2 which is given a reciprocative movement for cutting, and a rotative movement for generating the curves of the teeth on the work. The work is represented as a disk-like blank 3 clamped to a holder 4 by a clamping plate 5 and a nut 6 (see Fig. 4). This holder, together with the clamp and nut, is carried by a work spindle 7 mounted rotatively in a slide 8, said slide being, as shown in Fig. 4, arranged to travel on a guide 9 formed on the base 10 of the machine.

The cutter and work are progressively rotated in unison, the means for thus rotating or indexing the blank being a worm wheel 11 secured to the work spindle 9, and a worm 12 carried by a shaft section 13. This worm shaft has upon it a bevel gear 14 which meshes with a gear 15 on the feed rod 16, said rod receiving its motion from a shaft 17 through change gears 18 19 20 and 21, the latter being driven by a bevel gear 22 on the shaft 17. This shaft receives its motion from the main counter-shaft 23, to which power for operating the machine is delivered through the pulleys 24 and 25, belt 26 and gears 27 28. The same shaft 17 10 also drives the cutter spindle rotatively through bevel gears 29 30, a shaft 31, bevel gears 32 33, and a worm shaft 34 which carries a worm meshing with a worm wheel connected to the cutter spindle, the last two 10 elements not being shown. It is thus seen that the same mechanism drives the cutter and work, and that each is in positive geared relation with this mechanism, so that they are caused to rotate slowly in exact unison. 11

The guideways for the slide 8 extend transversely of the cutter spindle so that the work may be brought up to the cutter when the cutting operation is begun, to get the proper depth feed. For thus feeding the work-holding slide and the work there is provided a feed screw 35 upon which is threaded a nut 36 having integral therewith a gear 37. This gear is operated by a pinion 38 with which is connected a ratchet 39 operated by a pawl 40. The pawl is connected to an arm 41 carried by a rock shaft journaled in a bracket 42, and having a second arm 43 engaged with a cam on the back of a gear 44, as in the machine shown in Patent No. 879,531, before referred to. Gear 44 is driven by a pinion 45 on the counter-shaft 3. The step-by-step motion thus given by the pawl 40 slowly turns the nut 36, and, the screw 35 being held against rotation, thus the slide is slowly drawn toward the cutter. Hand-feed of the work is accomplished by a crank applied to a crank-shaft 46 having a worm 47 which meshes with a worm wheel 48 on a nut 49 engaged with the screw 35 within the base of the machine.

As has previously been said, the cutter spindle is reciprocated in order to enable the cutter to plane grooves in the gear blank. The mechanism for reciprocating the cutter is not herein illustrated, but it is the same as, or equivalent to, that shown in Patent No. 879,531, as are also the details of the mechanism for indexing the cutter and other details of construction and operating parts which are not particularly shown or referred to herein. For such details, attention is directed to the said Patent No. 879,531.

Figs. 6, 7 and 8 illustrate the form of teeth cut on a crown gear by a machine of this character. The bottoms $a$ of the grooves or notches between the teeth are of equal width throughout, owing to their being formed by the outer ends of the planing cutter teeth. The effect of the rotation of the cutter and blank in intersecting planes is to give the sides and outer faces of the teeth an abnormal shape, the sides $c$ $d$ having a steeper inclination at their inner ends than at their outer ends, in consequence of which the faces $e$ of the teeth are of diminishing width from their inner to their outer ends. In consequence of the abnormal form thus given the teeth of the crown gear, they are adapted to mesh properly with a spur gear or pinion mounted to rotate in a plane transverse to that of the crown gear, for the enlargement of the tooth spaces at their outer ends enables a sort of relative rolling motion between the teeth, about an axis perpendicular to the pitch plane of the crown gear teeth, to take place; the spur gear teeth being able to enter and leave the complemental tooth spaces freely and without binding.

I claim:—

1. A machine for generating gears with teeth formed in a side face thereof, comprising a rotatable blank support, a rotatable tool provided with a cutting element, the axis of said tool being arranged at an angle to the axis of the blank support, means for reciprocating said tool in a direction toward and from the center of the blank, and means for rotating the tool during the reciprocation thereof and in time with the rotation of said blank support, whereby the spaces between the teeth formed on the blank are wider at the outer ends than at the inner ends.

2. A machine for generating gears with teeth formed on a side face thereof, comprising a rotatable blank support, a tool provided with a plurality of cutting elements arranged in a circular series, the axis of said tool being at an angle to the axis of the blank support, means for reciprocating the cutting elements in a direction toward and from the center of said blank, and means for rotating said tool to shift the cutting elements laterally in unison with the rotation of said blank, whereby the spaces between the teeth formed on the blank are wider at the outer ends than at the inner ends.

3. A gear generating machine comprising a blank-supporting spindle, means for rotating the same, a cutter spindle, said spindles being arranged at approximately right angles to one another, means for securing a gear blank to said supporting spindle transversely thereof, a planing cutter carried by said cutter spindle, means for reciprocating said spindle to carry the cutter in a direction toward and from the center of the blank, and means for rotating said cutter spindle to shift the cutter laterally in unison with the rotation of said blank-supporting spindle, whereby the spaces between the teeth formed on the blank are wider at the outer ends than at the inner ends.

4. A gear generating machine comprising a blank supporting spindle, means for rotating the same, a cutter spindle provided with a plurality of cutters arranged in a circular series, said spindles being arranged at approximately right angles to one another, means for securing a gear blank to said supporting spindle transversely thereof, a planing cutter carried by said cutter spindle, means for reciprocating said spindle to carry the cutter in a direction toward and from the center of the blank, and means for rotating said cutter spindle to shift the cutters laterally in unison with the rotation of said blank supporting spindle, whereby the spaces between the teeth formed on the blank are wider at the outer ends than at the inner ends.

5. A crown-gear-shaping machine comprising a planing cutter having a circular series of radial cutter teeth mounted and driven to travel reciprocatively in a path approximately coincident with its axis, a blank-supporting spindle arranged transversely of the path of travel of said cutter, a blank holder carried by said spindle and constructed to hold a crown gear blank coaxially of the spindle, a slide in which said spindle is mounted rotatively, said slide being movable toward and from the line of travel of the cutter to feed the work, and means for rotating said spindle, and means for rotating said cutter to shift the cutter teeth laterally in unison with the rotation of said spindle, whereby the spaces between the teeth formed on the blank are wider at the outer ends than at the inner ends.

6. A machine for generating the teeth of crown wheels and gears of like nature, comprising a work-supporting slide, a work spindle mounted rotatively upon said slide, a blank holder carried by said spindle and constructed to secure a blank coaxially of the spindle, a rotative and reciprocative cutter spindle, a planing cutter having radial gear-formed cutter teeth carried by said spindle and arranged to plane the work by movements in the general direction of its axis, said spindles being arranged at such an angle relatively to each other that the cutter is caused to reciprocate across the face of the blank, worm and wheel gearings for rotating each of said spindles, said cutter spindle being rotated during its reciprocation to shift the cutter teeth laterally, whereby the spaces between the teeth formed on the blank are wider at the outer ends than at the inner ends, common driving mechanism for both of said gearings, whereby the cutter and blank are indexed in unison, and feed mechanism for said slide by which the blank is fed up to the cutter.

In testimony whereof I have affixed my signature, in presence of two witnesses.

EDWIN R. FELLOWS.

Witnesses:
E. J. FULLAM,
ALICE M. WHEELER.